United States Patent
Shanbhag et al.

(10) Patent No.: US 12,524,316 B2
(45) Date of Patent: Jan. 13, 2026

(54) DATA RESTORE OPERATION USING PARALLEL READS AND WRITES AND INCREMENTAL COMPRESSION

(71) Applicant: HEWLETT PACKARD ENTERPRISE DEVELOPMENT LP, Spring, TX (US)

(72) Inventors: Pavan Subbayya Shanbhag, Karnataka (IN); Sumantha Kannantha, Karnataka (IN); Bhagyashree Charudatta Sarawate, Karnataka (IN); Swapnil Sunil Nilangekar, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 37 days.

(21) Appl. No.: 18/614,811

(22) Filed: Mar. 25, 2024

(65) Prior Publication Data
US 2025/0298703 A1    Sep. 25, 2025

(51) Int. Cl.
G06F 11/14    (2006.01)
(52) U.S. Cl.
CPC ...... G06F 11/1469 (2013.01); G06F 11/1456 (2013.01); G06F 11/1464 (2013.01)
(58) Field of Classification Search
CPC ............. G06F 11/1469; G06F 11/1456; G06F 11/1464
USPC ........................................................ 714/6.3
See application file for complete search history.

(56) References Cited

U.S. PATENT DOCUMENTS

| | | | |
|---|---|---|---|
| 7,756,817 B2 | 7/2010 | Merchia et al. | |
| 7,987,161 B2* | 7/2011 | Williams | H03M 7/30 707/693 |
| 11,451,569 B1 | 9/2022 | Pendse et al. | |
| 11,537,551 B2 | 12/2022 | Shahin et al. | |
| 2010/0318497 A1* | 12/2010 | Price | G06F 11/1446 707/693 |
| 2014/0181016 A1* | 6/2014 | Whitehead | G06F 11/2064 707/613 |
| 2020/0028671 A1 | 1/2020 | Masek et al. | |
| 2022/0043806 A1 | 2/2022 | Crabtree et al. | |

OTHER PUBLICATIONS

IBM; "Systems management—Backup and recovery—Parallel restore operations"; Oct. 10, 2023; 2 pages.
Klauspost, PGZIP downloaded Feb. 22, 2024 (5 pages).
Wikipedia, tar (computing) downloaded Jan. 31, 2024 (12 pages).
Wikipedia, ZIP (file format) downloaded Jan. 31, 2024 (11 pages).

* cited by examiner

*Primary Examiner* — Yair Leibovich
(74) *Attorney, Agent, or Firm* — Trop, Pruner & Hu, P.C.

(57) ABSTRACT

As part of a data restore operation from a backup data store, a system reads data objects of the backup data store in parallel into a buffer, which includes reading chunks of a first data object into the buffer. The data objects are provided from the buffer to a data compressor that incrementally compresses the data objects as the data objects are received at the data compressor to produce compressed data objects. The compressed data objects are transferred in parallel to a target data store as part of the data restore operation.

17 Claims, 4 Drawing Sheets

DATA RESTORE OPERATION USING PARALLEL READS AND WRITES AND INCREMENTAL COMPRESSION

BACKGROUND

Data of a computing system can be backed up to a backup data store to provide redundancy in case of data errors or component faults (e.g., faults of hardware components or of machine-readable instructions). If data of the computing system becomes corrupted or is lost, a data restore operation can be performed to restore data from the backup data store.

BRIEF DESCRIPTION OF THE DRAWINGS

Some implementations of the present disclosure are described with respect to the following figures.

Figure 1:
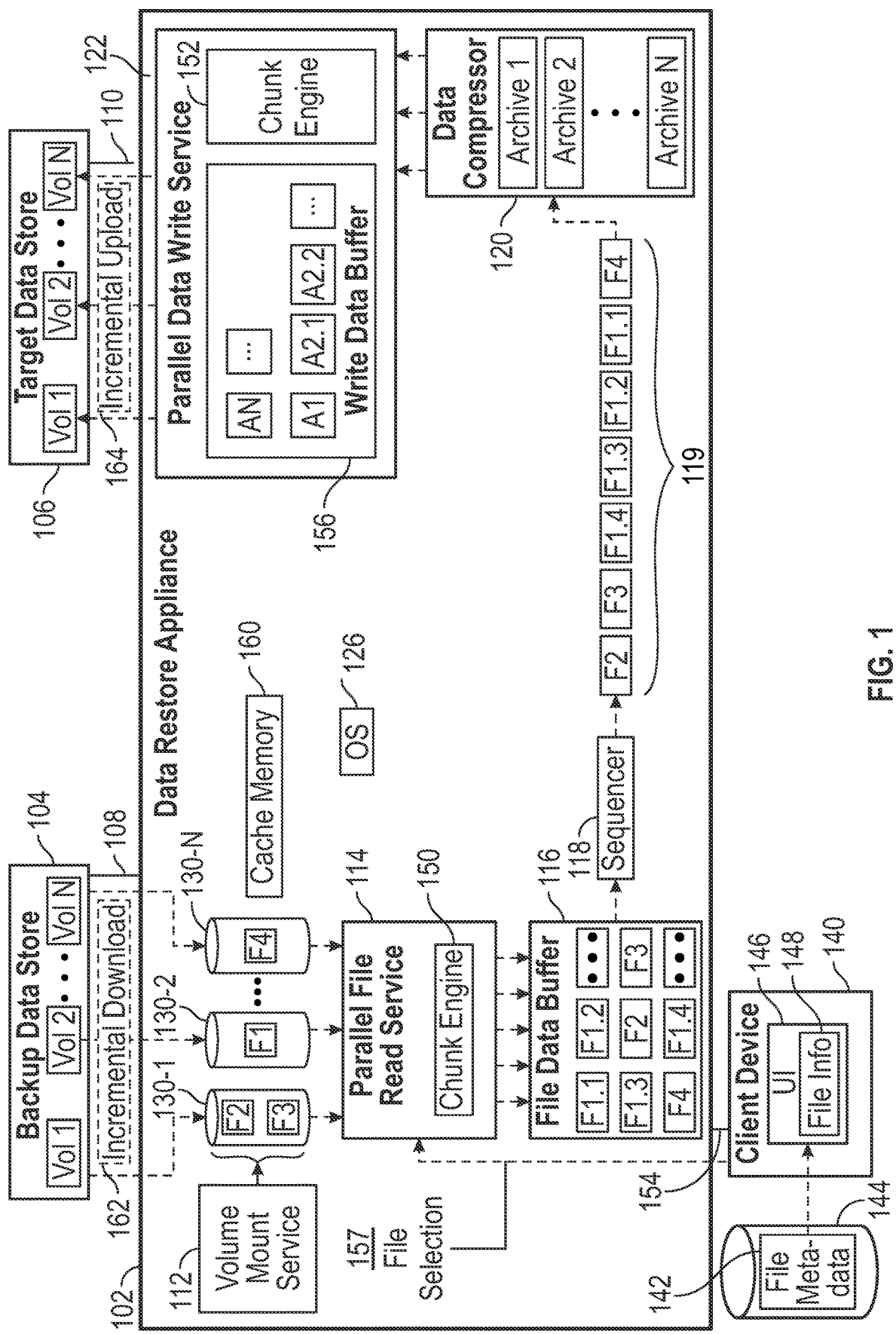
FIG. 1 is a block diagram of an arrangement that includes a data restore appliance to restore data from a backup data store to a target data store, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A data restore operation to restore data from a backup data store to a target data store can include multiple stages. The target data store may be part of a computing environment, such as a cloud computing environment, a data center, or another computing environment. The backup data store can be provided at a location that is remote from the target data store. The backup data store may also be part of a computing environment, such as a cloud computing environment, a data center, or another computing environment. The data restore operation may be performed by a data restore appliance. The data restore appliance may include a virtual computing entity, such as a virtual machine (VM), a container, or another virtual entity. Alternatively, the restore appliance may include a physical computer system.

The multiple stages of the data restore operation may be associated with respective latencies. If the latency experienced by any given stage of the multiple stages were to increase, then the increased latency of the given stage may slow down either upstream stages or downstream stages, or both upstream and downstream stages. The increased latency of the given stage may cause "blocking" of the data restore operation, which refers to stopping or slowing down the data restore operation. An upstream stage relative to the given stage refers to a stage that applies an action of the data restore operation prior to the given stage. A downstream stage relative to the given stage refers to a stage that applies an action of the data restore operation after to the given stage. Latencies in any of the multiple stages of the data restore operation may be caused by any or some combination of factors, including, for example, an increased load experienced by a processing resource, a memory being filled to capacity, a reduced bandwidth of a communication link, faults in resources (including hardware resources and/or machine-readable instructions), or other factors.

In accordance with some implementations of the present disclosure, a non-blocking object-level restore system is provided to allow for the restoration of selected data objects in a backup data store (the selected data objects may be less than the entirety of the data objects in the backup data store). The "non-blocking" feature of the restore system reduces the likelihood that a data restore operation is slowed down due to an increased latency experienced at any of the multiple stages of the data restore operation. The restore system employs parallel input/output (I/O) operations in the data restore operation. For example, reads of data objects from the backup data store can be parallelized, and writes of data objects to the target data store can be parallelized. Additionally, a data compression stage of the data restore operation is able to apply incremental data compression on data objects to progressively build up a representation of compressed data objects. In some examples, the representation of compressed data objects can include an archive object, such as a tar file or any other type of archive object. Data objects are read from the backup data store in parallel into a data buffer. A sequencer transfers the data objects from the data buffer to a data compressor. The data compressor produces the representation of compressed data objects. Compressed data objects are written in parallel to the target data store.

Examples of data objects include files, such as files of a file system. More generally, data objects can refer to any units of data that can be separately identified.

FIG. 1 is the block diagram of an example arrangement that includes a data restore appliance 102 that is able to restore data from a backup data store 104 to a target data store 106. The backup data store 104 and the target data store 106 are each implemented using a collection of storage devices. As used here, a "collection" of items can refer to a single item or multiple items. Examples of storage devices can include any or some combination of the following: disk-based storage devices, solid state drives, or other types of devices that are able to store data. The backup data store 104 and the target data store 106 are part of respective computing environments, such as cloud computing environments, data centers, or other types of computing environments.

The data restore appliance 102 is connected over a network 108 to the backup data store 104, and the data restore appliance 102 is connected over a network 110 to the target data store 106. Although two separate networks 108 and 110 are depicted, it is noted that in other examples, the data restore appliance 102 can be connected to the backup data store 104 and the target data store 106 over the same network. Examples of networks include local area networks (LANs), wide area networks (WANs), public networks such as the Internet, or other types of communication links.

In some examples, the data restore appliance 102 can be implemented using one or more virtual computing entities, such as VMs or containers. A VM or container can include a program to perform a data restore operation. In other examples, the data restore appliance 102 can be implemented using a physical computer system including one or more computers, where the computers are able to execute programs that are able to perform data restore operations.

The target data store 106 includes a number of volumes, including volume 1 to volume N (N≥1). The backup data store 104 similarly includes a number of volumes 1 to N, where each volume of the backup data store 104 contains backup data for a corresponding volume in the target data store 106. A volume of the backup data store 104 is referred to as a "backup volume."

A "volume" can refer to a logical partition of data. In some examples, different volumes stored in a target data store 106 are associated with different entities that make use of data in the respective volumes. An "entity" can refer to a program, a machine, or a user. For example, different volumes can be used by different types of database programs. Another volume may be associated with an operating system (OS) of a computer system. Yet another volume can be associated with a management program, a maintenance program, or other types of programs.

In some examples, the target data store 106 can include any or some combination of the following: a Simple Storage Service (S3) data store from AMAZON WEB SERVICES (AWS), a Google Cloud Storage data store, a Microsoft AZURE data store, or any other type of data store. The backup data store 104 may also be implemented using an S3 data store or any other type of data store.

An S3 data store can include S3 buckets, where an S3 bucket can include one or more S3 objects. Each of volumes 1 to N can include one or more S3 buckets. In examples where data is stored in files, the data of a file may be included in one or more S3 objects. Conversely, an S3 object may include data of one or more files. If other types of data stores are used, the data in the volumes may have different forms.

In the ensuing discussion, it is assumed that the data restore appliance 102 is able to restore files from the backup data store 104 to the target data store 106. More generally, the data restore appliance 102 is able to restore data objects from the backup data store 104 to the target data store 106. Data objects can refer to files, S3 objects, or any other units of data.

The data restore appliance 102 includes a volume mount service 112, a parallel file read service 114, a sequencer 118, a data compressor 120, and a parallel data write service 122. Each of the volume mount service 112, the parallel file read service 114, the sequencer 118, the data compressor 120, and the parallel data write service 122 can be implemented using hardware processing circuitry of the data restore appliance 102, or machine-readable instructions executable by a processing resource associated with the data restore appliance 102.

A "processing resource" can refer to one or more hardware processing circuits, which can include any or some combination of a microprocessor, a core of a multi-core microprocessor, a microcontroller, a programmable integrated circuit, a programmable gate array, or another hardware processing circuit.

The volume mount service 112 is able to mount each backup volume of the backup data store 104 as a respective virtual storage device in the data restore appliance 102. For example, the mounted virtual storage device can include a virtual disk, such as a disk associated with a VM (which is referred to as a "VM disk").

In examples according to FIG. 1, the volume mount service 112 can mount backup volume 1 of the backup data store 104 as a virtual disk 130-1, mount backup volume 2 as a virtual disk 130-2, and mount backup volume N as a virtual disk 130-N. Mounting a virtual storage device, such as a virtual disk, refers to creating a reference (referred to as a mount point) at which the virtual storage device is accessible by a local system, which in FIG. 1 is the data restore appliance 102 (or a module within the data restore appliance 102). The mount point may include a directory, sometimes referred to as a "root directory." Alternatively, the mount point can also be implemented as a program that allows access of data in a virtual storage device.

The mounted virtual disk can be visible to an OS 126 of the data restore appliance 102 at the mount point in the VM. If the data restore appliance 102 is a VM, then the OS 126 is a guest OS.

Once a virtual disk is mounted, an entity in the data restore appliance 102, such as the parallel file read service 114, is able to retrieve files from a respective backup volume of the backup data store 104 into the mounted virtual disk. For example, the parallel file read service 114 can request the retrieval of files F2 and F3 into the virtual disk 130-1 from backup volume 1, the retrieval of file F1 into the virtual disk 130-2 from backup volume 2, and the retrieval of file F4 into the virtual disk 130-N from backup volume N. Although specific quantities of files are depicted in each virtual disk, it is noted that in other examples, a different quantity of files can be retrieved into a virtual disk. A request to retrieve a file from a backup volume can be issued by the parallel file read service 114 to the backup data store 104.

The retrieval of a file from a backup volume in the backup data store 104 to a virtual disk involves an incremental download (162) of pieces of the file. In other words, the file does not have to be downloaded in its entirety, but rather, can be downloaded piece-by-piece to the virtual disk.

As files are retrieved into one or more virtual disks in the data restore appliance 102, the parallel file read service 114 can perform a parallel read of the files from the one or more virtual disks into a file data buffer 116. Note that the parallel file read service 114 can initiate a read of a file from a virtual disk to the file data buffer 116 even before all pieces of the file are retrieved into the virtual disk by the incremental download (162). The file data buffer 116 may be configured to have a specified storage size. The file data buffer 116 can be implemented as part of a memory (not shown) of the data restore appliance 102. The memory can be implemented using one or more memory devices, including any or some combination of the following: a dynamic random access memory (DRAM) device, a static random access memory (DRAM) device, a flash memory device, or another type of memory device. Alternatively or additionally, the memory can be implemented using disk-based storage devices or solid state drives.

The parallel file read service 114 includes a chunk engine 150 that is able to divide large files into smaller file chunks. A "file chunk" can refer to any segment of a file that has a size less than the file. A "chunk" can refer to any segment of a larger data object. The size of a chunk as created by the chunk engine 150 may be different from or the same as a size of a piece of a file incrementally downloaded from the backup data store 104 to a virtual disk. A "large" file (or "large" data object) refers to a file (or data object) that has a size greater than a file size threshold, which can be set by an administrator or another entity.

In the example of FIG. 1, it is assumed that file F1 in the virtual disk 130-2 has a size that is greater than the file size threshold, while files F2, F3 in the virtual disk 130-1 and file F4 in the virtual disk 130-N have sizes less than the file size threshold. Thus, the chunk engine 150 would divide file F1 into file chunks, but would not divide files F2, F3, and F4 into file chunks.

The chunk engine 150 can be implemented using a portion of the hardware processing circuitry or machine-readable instructions of the parallel file read service 114. Alternatively, the chunk engine 150 may be separate from the parallel file read service 114.

The parallel file read service 114 can spawn multiple read threads to read files (and file chunks) in parallel into the file data buffer 116. A "read thread" can be an instance of the parallel file read service 114. Multiple read threads spawned by the parallel file read service 114 can execute in parallel to transfer different files and file chunks to the file data buffer 116.

For example, files F2 and F3 can be read in parallel by two read threads into the file data buffer 116. As a further example, assume the chunk engine 150 has divided file F1 into 500 chunks (e.g., F1.1, F1.2, F1.3, F1.4, etc.). In such an example, the parallel file read service 114 can spawn multiple threads, up to 500 read threads, to read the 500 file chunks of file F1 in parallel to the file data buffer 116. More generally, for a file that is divided into P (P≥2) file chunks, the parallel file read service 114 can spawn M (M≥1) read threads to read respective subsets of the file chunks in parallel into the file data buffer 116, where each subset of file chunks can include one file chunk or multiple file chunks. In the example above, each read thread can transfer P/M file chunks to the file data buffer 116.

As the files (and file chunks) are transferred into the file data buffer 116, the sequencer 118 can transfer the files (and file chunks) in a data sequence 119 of files (and file chunks) from the file data buffer 116 to the data compressor 120. A complete file written to the file data buffer 116 can be transferred immediately to the data compressor 120. A "complete" file is a file that has not been divided into file chunks by the chunk engine 150. The term "immediately" can refer to the sequencer 118 initiating the transfer of the file from the file data buffer 116 to the data compressor 120 in response to the sequencer 118 detecting that the file has been written to the file data buffer 116, without the sequencer 118 having to wait for another event, such as the writing of another file or file chunk into the file data buffer 116.

If a file (e.g., file F1) has been divided into file chunks, the sequencer 118 transfers the file chunks in sequence to the data compressor 120. Each given file chunk of the file is associated with a sequence number, which is any value that indicates where in a sequence of file chunks the given file chunk is located. The sequencer 118 prevents file chunks of the file from being transferred to the data compressor 120 out of order.

The data compressor 120 is also able to add files from respective virtual disks to corresponding archive files. An "archive file" (or more generally an "archive object") can refer to a data container to receive data that is to be compressed by the data compressor 120. An example of an archive file is a tar file, also referred to as a tar ball. Other forms of archive files can be used in other examples.

An archive file is created by the data compressor 120 per virtual disk, for example. For example, files F2 and F3 of the virtual disk 130-1 are added to archive file 1, file F1 of the virtual disk 130-2 is added to archive file 2, and file F4 of the virtual disk 130-N is added to archive file N. Archive files 1, 2, and N can be stored in a memory of the data restore appliance 102. Data of files associated with a virtual disk are added to a respective archive file, and the data compressor 120 performs incremental compression on the data added to the respective archive file.

As used here, "incremental compression" refers to compression that is applied to less than the entirety of data of an archive file. For example, instead of waiting for all files of a respective virtual disk to be added to the archive file before data compression is applied, the data compressor 120 is able to start a partial compression (incremental compression) of a subset of files of the respective virtual disk as the subset of files (one file or multiple files) is added of the respective virtual disk is added to the archive file from the data sequence 119. Subsequently, as one or more additional files of the respective virtual disk are added to the archive file from the data sequence 119, further incremental compression can be applied to the data in the archive file by the data compressor 120.

For file F1 (which has been divided into multiple file chunks), the data compressor 120 waits for all file chunks of file F1 to arrive in the archive file 2 before data compression is applied to the file chunks. The sequencer 118 may provide to the data compressor 120 that an indicator when a last of the file chunks of file F1 is provided to the data compressor 120. The indicator may be an end-of-file indicator, for example, where the end-of-file indicator may include a flag set to a particular value, a special character, or any other type of indicator.

In some examples, the data compressor 120 includes a zip writer that compresses data into a ZIP format. In other examples, the data compressor 120 can compress data into other compression formats, such as RAR or another format. The data compression applied by the zip writer is a lossless compression, which means that when compressed data generated by the zip writer is decompressed, the decompressed data does not suffer any loss of data as a result of the decompression. Various types of zip writers can be used to apply incremental data compression. In some examples, a zip writer can employ a PgZip fast compression library, which can apply parallel compression for enhanced compression speeds. For example, the zip writer can divide a file received by the zip writer (such as from the sequencer 118) into multiple portions, and the zip writer can spawn multiple PgZip threads to compress the multiple portions of the file in parallel. The compressed data produced by compressing the multiple portions of the file are provided as a compressed form of the file in the respective archive file.

In other examples, a zip writer can use other compression techniques, such as the Deflate compression technique that uses Lempel-Ziv 1977 (LZ77) and Huffman coding, the Bzip2 compression technique that is based on the Burrows-Wheeler transform and uses Huffman coding, the Zstandard compression technique, the LZ4 compression technique, the Snappy compression technique, or other compression techniques.

The parallel data write service 122 is able to perform parallel transfers of the archive files 1, 2, and N to a write data buffer 156, which can be implemented with the memory of the data restore appliance 102. In some examples, the parallel data write service 122 includes a chunk engine 152 that is able to divide large archive files into smaller archive file chunks. The size of a chunk as created by the chunk engine 152 may be different from or the same as a size of a chunk created by the chunk engine 150 of the parallel file read service. A "large" archive file (or "large" archive data object) refers to an archive file (or archive data object) that has a size greater than an archive file size threshold, which can be set by an administrator or another entity.

The chunk engine 152 can be implemented using a portion of the hardware processing circuitry or machine-readable instructions of the parallel data write service 122.

Alternatively, the chunk engine 152 may be separate from the parallel data write service 122.

In the example of FIG. 1, it is assumed that archive file 2 (which stores data of file F1) has a size that is greater than the archive file size threshold, while archive files 1 and N have sizes less than the archive file size threshold. Thus, the chunk engine 152 would divide archive file 2 into archive file chunks (A2.1, A2.2, etc.), but would not divide archive files 1 and N into archive file chunks. The archive file chunks A2.1, A2.2, etc. are stored in the write data buffer 156. Archive files 1 and N are stored as A1 and AN in the write data buffer 156.

The parallel data write service 122 can transfer the archive files (and archive file chunks) from the write data buffer 156 to respective volumes of the target data store 106. Note that the transfer of archive files to the target data store 106 are part of an incremental upload (164) of the archive files, in which pieces of each archive file can be incrementally uploaded to the target data store 106. A piece of an archive file that is incrementally uploaded to a volume of the target data store 106 may have a size that is the same as or different from the size of a chunk created by the chunk engine 152 of the parallel data write service 122.

The parallel data write service 122 can spawn multiple write threads to transfer, in parallel, archive files (and archive file chunks) to the write data buffer 156. A write thread can be an instance of the parallel data write service 122. In some examples, the data of files restored into each volume of the target data store are for files selected by a user, such as at a client device 140, for a data restore operation. In other words, the data restore operation does not have to be a full data restore operation in which all files of the backup data store 104 are restored to the target data store 106. Rather, the data restore operation can be a partial data restore operation in which selected files of the backup data store 104 are restored to respective volumes of the target data store 106.

Figure 2:
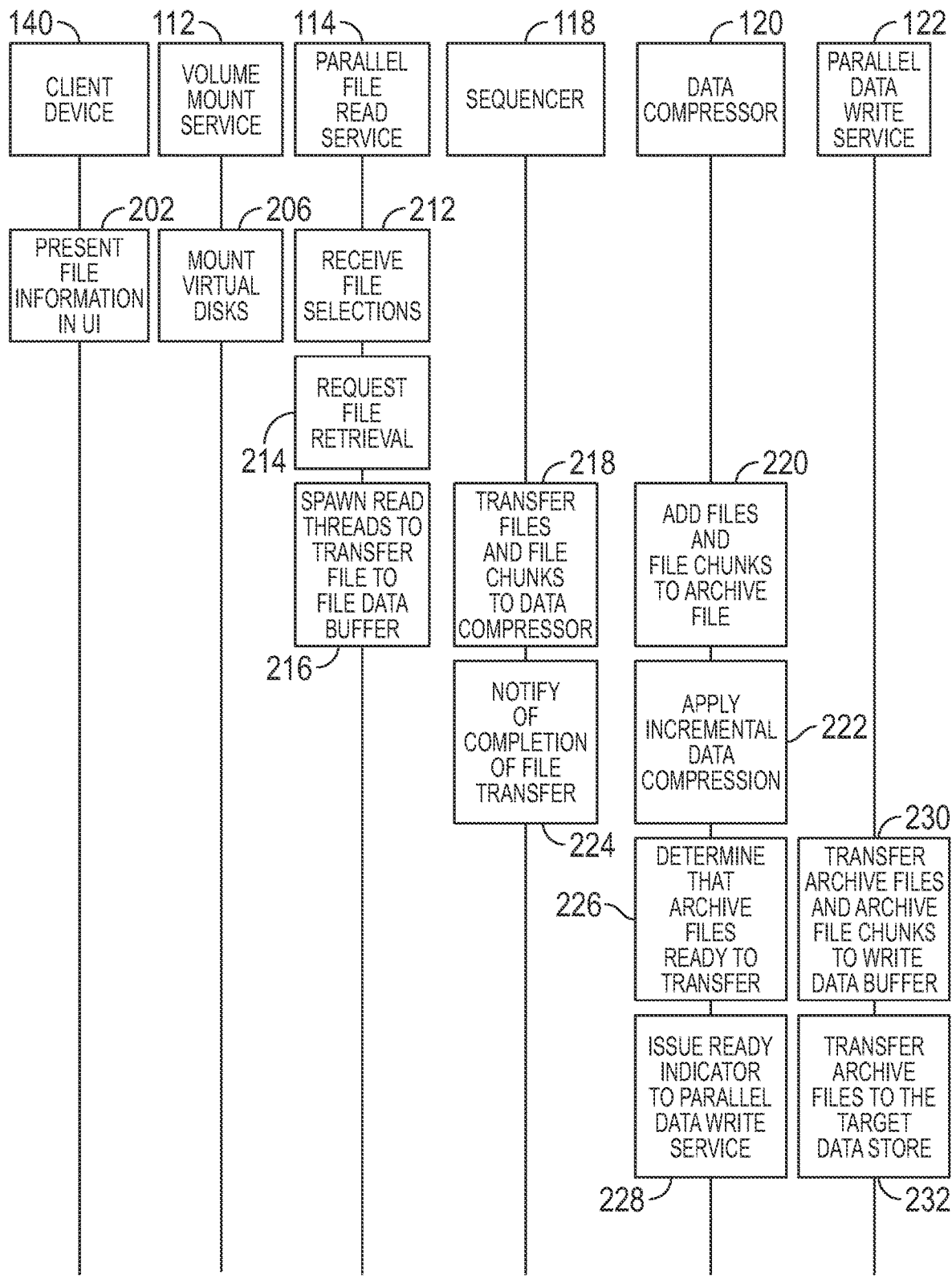
FIG. 2 is a flow diagram of a process of the data restore appliance according to some examples.

The following discussion refers to both FIG. 1 and FIG. 2. FIG. 2 is a flow diagram of a process of the data restore appliance 102 according to some examples of the present disclosure.

The process of FIG. 2 is initiated in response to a restore request to perform a data restore operation. The restore request can be sent from the client device 140 to the data restore appliance 102, such as over a network 154. Examples of client devices can include any or some combination of the following: a computer (a desktop computer, a notebook computer, a tablet computer, etc.), a smartphone, or any other type of electronic device.

In some examples, a user, such as an administrator, may use the client device 140 to request the data restore operation, such as in response to detecting data errors in the target data store 106 that cannot be recovered. In other examples, a data restore operation may be requested by a different entity, such as a program or machine.

The client device 140 can access file metadata 142 stored in a data repository 144, which can be implemented using one or more storage devices. The file metadata 142 can include information of files that are stored in the backup data store 104. The file metadata 142 may be provided by an administrator or by another entity. As examples, the file metadata 142 can include filenames or other identifiers of files, as well as information of directories in which the files are located.

Based on the file metadata 142, the client device 140 presents (at 202), in a UI 146 displayed by the client device 140, file information 148 that represents files stored in the backup volumes of the backup data store 104. The UI 146 includes control elements that allow the user of the client device 140 to select which files of each backup volume are to be restored. For a given backup volume in the backup data store 104, the files selected by the user in the UI 146 can be less than all of the files associated with the given backup volume. For example, backup volume 2 of the backup data store 104 may include 100 files. However, the user may select just file F1 to restore, and not the remaining 99 files.

In response to the restore request received at the data restore appliance 102, the volume mount service 112 mounts (at 206) the virtual disks 130-1, 130-2, and 130-N that correspond to volumes 1, 2, and N. Although FIG. 1 shows an example in which multiple virtual disks are mounted in response to a data restore operation, in other examples, a different quantity of the virtual disks are mounted. For example, a requested data restore operation may involve less than all of volumes 1, 2, and N, in which case just the virtual disks for those volumes are mounted by the volume mount service 112.

The virtual disks 130-1 to 130-N are initially mounted as empty virtual disks, i.e., the virtual disks are initially not filled with any data from the respective volumes.

The parallel file read service 114 receives (at 212) the file selections (157) made in the UI 146. A "file selection" can specify files to restore, or directories to restore, where a directory can include one or more files.

In response to the file selections (157), the parallel file read service 114 can request (at 214) the retrieval of the selected files from backup volumes 1, 2, and N to the virtual disks 130-1, 130-2, and 130-N. In the example of FIG. 1, the selected files are files F2 and F3 from backup volume 1, file F1 from volume 2, and file F4 from volume N. Files not selected in the file selections (157) are not retrieved into respective virtual disks 130-1, 130-2, and 130-N.

In some examples, the data restore appliance 102 includes a cache memory 160 that may store at least some of the requested files. The cache memory 160 may store some files of the backup data store 104 as a result of a prior data restore operation. When the parallel file read service 114 requests a particular file form a backup volume, the parallel file read service 114 can first check if the particular file is in the cache memory 160, and if not, the parallel file read service 114 can retrieve the particular file from the corresponding backup volume of the backup data store 104.

As files are transferred as part of the incremental download (162) from the backup data store 104 to the virtual disks 130-1, 130-2, and 130-N, the parallel file read service 114 spawns read threads to transfer (at 216), in parallel, the files to the file data buffer. Any large files (e.g., file F1) are divided by the chunk engine 150 into file chunks, and the read threads can also transfer the file chunks in parallel to the file data buffer 116.

The sequencer 118 transfers (at 218) files (and file chunks) in the file data buffer 116 in the data sequence 119 to the data compressor 120. In the case of file chunks of a given file, the sequencer 118 obtains sequence numbers associated with the file chunks, and transfers the file chunks in sequence to the data compressor 120. In other words, the file chunks of the given file are not transferred out of sequence to the data compressor 120.

The data compressor 120 adds (at 220) files (and file chunks) to respective archive files 1, 2, and N. For example, files F2 and F3 are added to archive file 1, the file chunks of file F1 are added to archive file F2, and the file F4 is added to archive file N. As a file(s) is received in an archive file, the data compressor 120 applies (at 222) incremental compression of the file(s). In the case of file F1, the data compressor 120 waits for all file chunks of file F1 to be received in archive file 2 before starting the incremental compression of file F1.

The sequencer 118 can notify (at 224) the data compressor 120 of when the transfer of file(s) to a given archive file is complete. For example, the sequencer 118 may receive, from the parallel file read service 114, an indication that the transfer of files F2 and F3 to the file data buffer 116 is complete. As part of transferring files F3 and F2 in the data sequence 119, the sequencer 118 can associate an end notification with file F2 (which is sent later than file F3 in the data sequence 119), where the end notification indicates that file F2 is the last file for the virtual disk 130-1. The end notification can be in the form of a message or an information element (e.g., a flag or other indicator).

In response to end notifications, the data compressor 120 is able to determine (at 226) that archive files 1, 2, and N are ready to transfer to the target data store 106 once the data compressor 120 has completed data compressions of the content of the archive files 1, 2, and N. As each respective archive file is ready to transfer, the data compressor 120 can issue (at 228) a ready indication to the parallel data write service 122 that the respective archive file is available for transfer. In response to each ready indication, the parallel data write service 122 transfers (at 230) the respective archive files to the write data buffer 156. Large archive files may be divided into chunks by the chunk engine 152 of the parallel data write service 122, and the parallel data write service 122 can transfer the archive file chunks in to the write data buffer 156. The parallel data write service 122 can spawn write threads to write the archive files (or archive file chunks) in parallel to the write data buffer 156.

The parallel data write service 122 uploads (at 232) archive files (and archive file chunks) from the write data buffer 156 as part of the incremental upload (164) to respective volumes of the target data store 106. For example, data of archive file 1 is incrementally uploaded to volume 1 of the target data store 106, data of archive file 2 is incrementally uploaded to volume 2 of the target data store 106, and data of archive file N is incrementally uploaded to volume N of the target data store 106.

In accordance with some examples of the present disclosure, the data restore appliance 102 is able to improve the efficiency at which a data restore operation can be performed by parallelizing I/O operations of the data restore operation using the parallel file read service 114 and the parallel data write service 122, and using incremental compression of files as the data compressor 120 receives the files in the data sequence 119 provided by the sequencer 118. Note further that incremental downloads of files are performed from the backup data store 104 to virtual disks, and incremental uploads of archive files are performed from the data restore appliance 102 to the target data store 106. Larger files can be handled more efficiently and quickly by dividing the larger files into file chunks when transferring to the file data buffer 116 or the write data buffer 156. The file data buffer 116 is a staging area that allow files to be transferred by the sequencer 118 to the data compressor 120 as the files are written to the file data buffer 116. In other words, files from a given virtual disk can be transferred from the file data buffer 116 to the data compressor 120 to apply incremental compression without having to wait for additional files from the given virtual disk. Similarly, the write data buffer 156 is a staging area that allows archive files to be uploaded from the write data buffer 156 to the target data store 106 as the archive files are written to the write data buffer 156.

The application of incremental compression allows for progressive building of the archive files. The data compressor 120 can also apply parallel compression of a file in an archive file for improved speed and performance of the data restore operation. By being able to perform parallel I/O operations as well as progressive compression of data, the overall size of the file data buffer 116 does not have to be large as files can be transferred out of the file data buffer 116 to the data compressor 120 to apply incremental compression as the files are received at the file data buffer 116. In other words, the file data buffer 116 does not have to be sized to handle the extreme case of having to store all files of the backup volumes to be restored at the same time. Similarly, the write data buffer 156 does not have to be large as archive files can be incrementally uploaded to the target data store 106 as the archive files are written to the write data buffer 156. Efficient use of the file data buffer 116 and the write data buffer 156 is accomplished by deleting files or file chunks from the file data buffer 116 and the write data buffer 156 as the files or file chunks are processed, such as by transferring the files or file chunks from the file data buffer 116 to the data compressor 120, or transferring the archive files or archive file chunks from the write data buffer 156 to the target data store 106. As a result, relatively small buffers 116 and 156 can be used for handling large amounts of data in the data restore appliance 102.

By using less resources (including storage and processing resources) in data restore operations, the cost of the data restore operations can be reduced. Also, being able to parallelize reads and writes from backup volumes of the backup data store 104 and to volumes of the target data store 106 can compensate for slow I/O speeds that may arise due to various causes. Even if a fault were to occur (e.g., the upload link to the target data store 106 is temporarily lost), the ability to stage files in the file data buffer 116 and archive files in the write data buffer 156 allows for the data restore operation to continue to proceed. When the upload link is restored, the progressively built archive files can be transferred by the parallel data write service 122 to the target data store 106.

Figure 3:
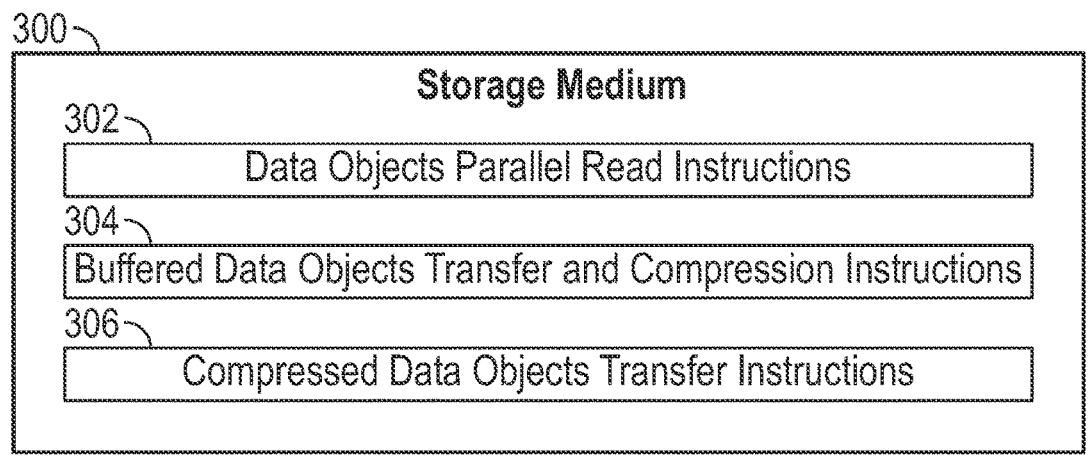
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include one or more computers.

The machine-readable instructions include data objects parallel read instructions 302 to, as part of a data restore operation from a backup data store, read data objects of the backup data store in parallel into a buffer. The data objects can be files or other types of data objects. In some examples, the data objects parallel read instructions 302 can divide a first data object into multiple chunks if a size of the first data object exceeds an object size threshold. The chunks of the first data object can be read in parallel into the buffer, such as by multiple read threads.

The machine-readable instructions include buffered data objects transfer and compression instructions 304 to provide the data objects from the buffer to a data compressor that incrementally compresses the data objects as the data objects are received at the data compressor to produce compressed data objects. Providing the data objects from the buffer to the data compressor includes providing the chunks of the first data object to the data compressor. In some examples, the chunks of the first data object are provided to the data compressor in sequence, such as based on sequence numbers associated with the chunks.

The machine-readable instructions include compressed data objects transfer instructions 306 to transfer, from the data compressor, the compressed data objects in parallel to a target data store as part of the data restore operation. For example, the compressed data objects can be written in parallel by a parallel data write service to a write data buffer. Some of the compressed data objects may be divided into compressed data object chunks that are written in parallel by write threads to the write data buffer. Compressed data objects (and compressed data object chunks) may be uploaded (incrementally) to the target data store.

In some examples, providing of the data objects from the buffer to the data compressor is performed by a sequencer (e.g., 118 in FIG. 1) that sends the chunks of the first data object in sequence from the buffer to the data compressor. For example, the sequencer can use the sequence numbers associated with the chunks to send the chunks of the first data object in sequence from the buffer to the data compressor.

In some examples, an object read service reads the data objects of the backup data store in parallel into the buffer. For example, the object read service can spawn a plurality of read threads to read the data objects in parallel to the buffer.

In some examples, as part of the data restore operation, the machine-readable instructions can mount a volume of the backup data store as a virtual storage device (e.g., a virtual disk). The virtual storage device after mounting is initially empty. The machine-readable instructions can determine which data objects of the volume are in a cache memory of the system. If a given object is in the cache memory, the machine-readable instructions can transfer the given data object from the cache memory to the virtual storage device. If a further data object is not in the cache memory, the machine-readable instructions can retrieve the further data object from the backup data store to the virtual storage device.

In some examples, the volume of the backup data store is associated with metadata representing the data objects of the volume. The machine-readable instructions can receive, from a user interface of a client device, a selection of data objects of the volume to restore in the data restore operation, where the data objects of the volume are presented by the client device in the user interface based on the metadata representing the data objects of the volume.

In some examples, the data objects read into the buffer are selected data objects based on the selection.

In some examples, the data compressor is to incrementally compress the first data object after the chunks of the first data object are received by the data compressor.

In some examples, the machine-readable instructions can transfer the data objects from the buffer to an archive object, where the data compressor is to incrementally compress data objects added to the archive object. The incremental compression of data objects added to the archive object progressively builds the archive object.

In some examples, the machine-readable instructions can determine whether the archive object has a size that exceeds a size threshold, and based on determining that the size of the archive object exceeds the size threshold, the machine-readable instructions can divide the archive object into a plurality of archive object chunks. A parallel data write service (e.g., 122 in FIG. 1) can transfer the plurality of archive object chunks in parallel to a write data buffer. The parallel data write service can upload data of the archive object chunks and archive objects from the write data buffer to the target data store.

In some examples, the data compressor can compress portions of a data object in parallel.

Figure 4:
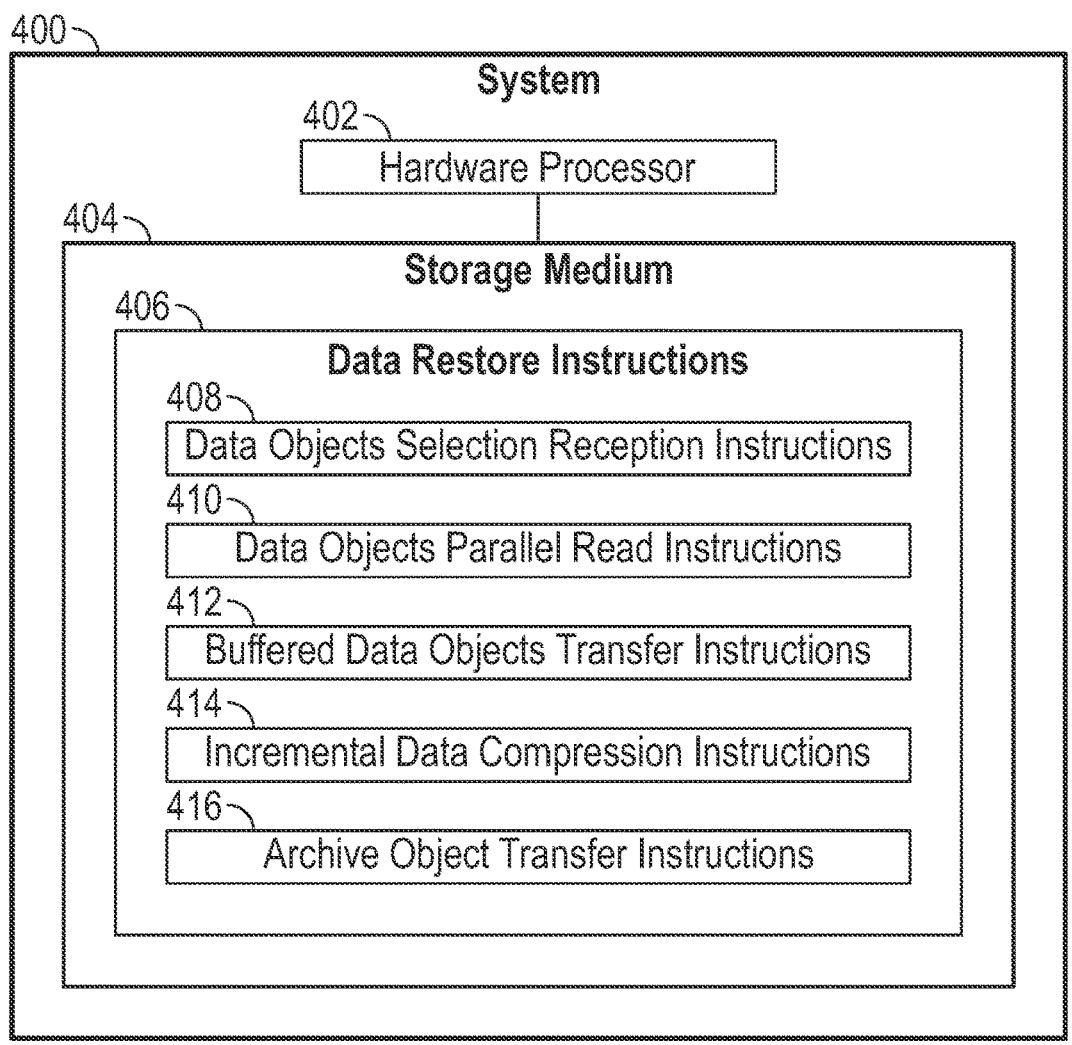
FIG. 4 is a block diagram of a system according to some examples.

FIG. 4 is a block diagram of a system 400 that includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing data restore instructions 406 executable on the hardware processor 402 to perform various tasks. Instructions executable on a hardware processor can refer to the instructions executable on a single hardware processor or the instructions executable on multiple hardware processors.

The data restore instructions 406 can be part of the data restore appliance 102 of FIG. 1, for example. The data restore instructions 406 include data objects selection reception instructions 408 to receive a selection of data objects of a backup data store to restore to a target data store in a data restore operation. The selection can be received from a UI, such as the UI 146 of FIG. 1.

The data restore instructions 406 can include data objects parallel read instructions 410 to read the data objects of the backup data store in parallel using a plurality of read threads into a buffer. Reading the data objects includes reading chunks of a first data object into the buffer.

The data restore instructions 406 can include buffered data objects transfer instructions 412 to provide the data objects from the buffer to a data compressor that adds the data objects into an archive object. Providing the data objects from the buffer to the data compressor includes providing the chunks of the first data object to the data compressor. The archive object may include archive file 1, 2, or N in FIG. 1.

The data restore instructions 406 can include incremental data compression instructions 414 to incrementally compress, using the data compressor, the data objects as the data objects are added to the archive object, to progressively build the archive object.

The data restore instructions 406 can include archive object transfer instructions 416 to transfer, from the data compressor, the archive object to a target data store as part of the data restore operation. In some examples, the data restore instructions 406 can determine that the first data object has a size that exceeds an object size threshold. Based on determining that the size of the first data object exceeds the object size threshold, the data restore instructions 406 can divide the first data object into the chunks. The data restore instructions 406 can determine that the archive object has a size that exceeds an archive size threshold. Based on determining that the size of the archive object exceeds the archive size threshold, the data restore instructions 406 can divide the archive object into a plurality of archive object chunks, and transfer the archive object chunks in parallel using a plurality of write threads to a write data buffer.

Figure 5:
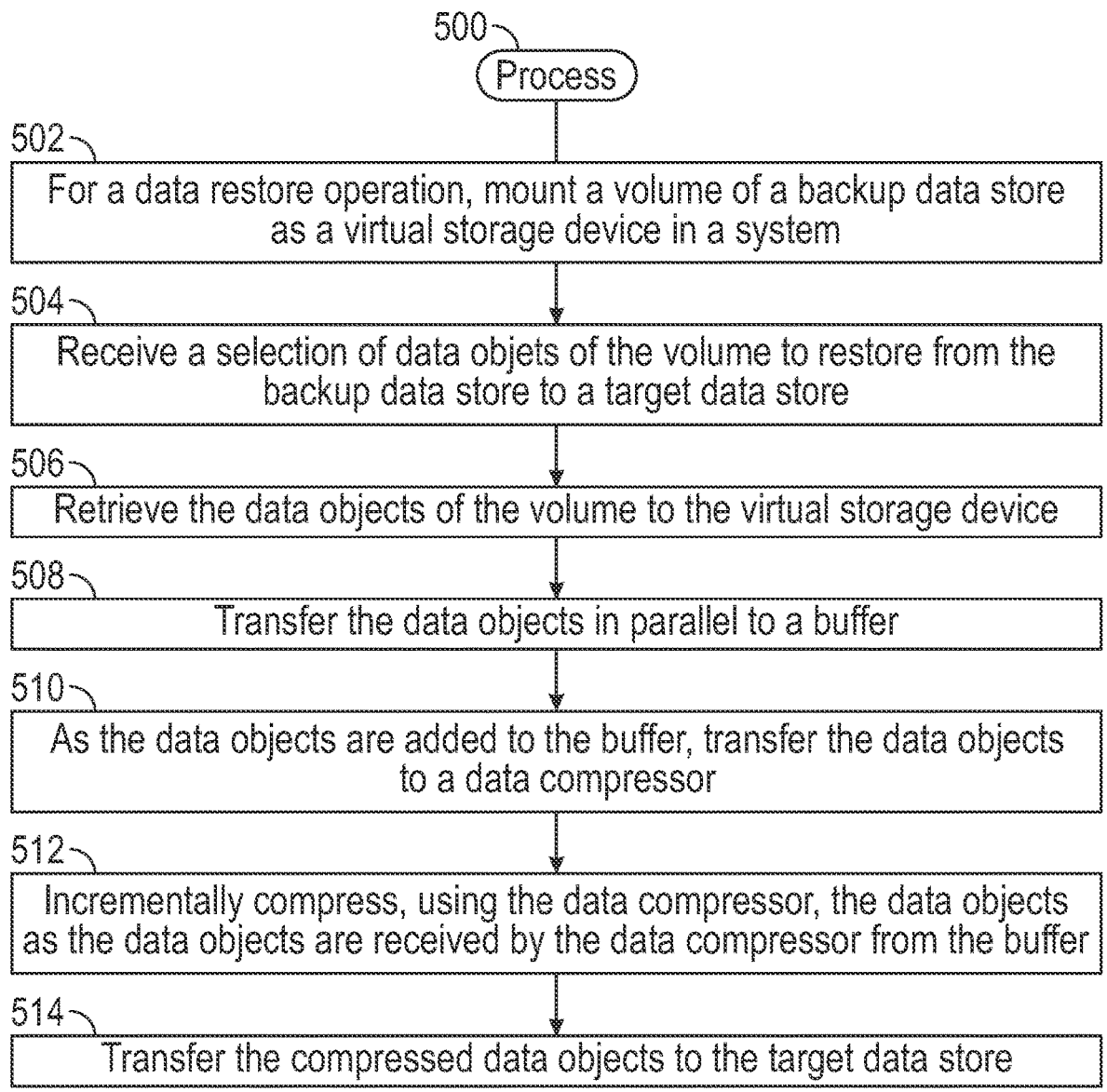
FIG. 5 is a flow diagram of a process according to some examples.

FIG. 5 is a flow diagram of a process 500 according to some examples of the present disclosure. The process 500 may be performed by the data restore appliance 102 of FIG. 1, for example.

The process 500 includes, for a data restore operation, mounting (at 502) a volume of a backup data store as a virtual storage device in a system. The virtual storage device may include a virtual disk, for example.

The process 500 includes receiving (at 504) a selection of data objects of the volume to restore from the backup data store to a target data store. The selection of data objects may be received from a UI, such as the UI 146 of FIG. 1.

The process 500 includes retrieving (at 506) the data objects of the volume to the virtual storage device. The data objects may be retrieved into the virtual storage device from either or both of a cache memory or a volume of the backup data store.

The process 500 includes transferring (at 508) the data objects in parallel to a buffer. For example, multiple read threads can be spawned to read the data objects in parallel.

As the data objects are added to the buffer, the process 500 includes transferring (at 510) the data objects to a data compressor. For example, a sequencer (e.g., 118 in FIG. 1) can transfer the data objects in a data sequence from the buffer to the data compressor.

The process 500 includes incrementally compressing (at 512), using the data compressor, the data objects as the data objects are received by the data compressor from the buffer.

The process 500 includes transferring (at 514) the compressed data objects to the target data store. In some examples, the compressed data objects are contained in an archive object built by the data compressor.

A storage medium (e.g., 300 in FIG. 3) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
as part of a data restore operation from a backup data store, read data objects of the backup data store in parallel into a buffer, wherein reading the data objects comprises reading chunks of a first data object into the buffer;
provide the data objects from the buffer to a data compressor that incrementally compresses the data objects as the data objects are received at the data compressor to produce compressed data objects, wherein providing the data objects from the buffer to the data compressor comprises providing the chunks of the first data object to the data compressor; and
transfer, from the data compressor, the compressed data objects in parallel to a target data store as part of the data restore operation,
wherein the providing of the data objects from the buffer to the data compressor is performed by a sequencer that sends the chunks of the first data object in sequence from the buffer to the data compressor.

2. The non-transitory machine-readable storage medium of claim 1, wherein the chunks of the first data object are associated with respective sequence numbers, and wherein the sequencer is to use the sequence numbers to send the chunks of the first data object in sequence from the buffer to the data compressor.

3. The non-transitory machine-readable storage medium of claim 1, wherein the instructions upon execution cause the system to:
determine, by an object read service, that the first data object has a size greater than a size threshold; and
divide, by the object read service based on the determination, the first data object into the chunks.

4. The non-transitory machine-readable storage medium of claim 3, wherein the reading of the data objects of the backup data store in parallel into the buffer is performed by the object read service.

5. The non-transitory machine-readable storage medium of claim 4, wherein the instructions upon execution cause the system to:
spawn, by the object read service, a plurality of read threads to read the data objects in parallel to the buffer.

6. The non-transitory machine-readable storage medium of claim 1, wherein the data compressor is to incrementally compress the first data object after the chunks of the first data object are received by the data compressor.

7. The non-transitory machine-readable storage medium of claim 1, wherein the instructions upon execution cause the system to:
read the chunks of the first data object in parallel by a plurality of read threads into the buffer.

8. The non-transitory machine-readable storage medium of claim 1, wherein the instructions upon execution cause the system to:
transfer the data objects from the buffer to an archive object, wherein the data compressor is to incrementally compress data objects added to the archive object.

9. The non-transitory machine-readable storage medium of claim 8, wherein the incremental compression of data objects added to the archive object progressively builds the archive object.

10. The non-transitory machine-readable storage medium of claim 9, wherein the instructions upon execution cause the system to:
determine whether the archive object has a size that exceeds a size threshold;
based on determining that the size of the archive object exceeds the size threshold, divide the archive object into a plurality of archive object chunks; and
transfer, by a parallel data write service, the plurality of archive object chunks in parallel to a write data buffer; and upload data of the plurality of archive object chunks and archive objects from the write data buffer to the target data store.

11. The non-transitory machine-readable storage medium of claim 1, wherein the data compressor is to compress portions of a data object in parallel.

12. A non-transitory machine-readable storage medium comprising instructions that upon execution cause a system to:
as part of a data restore operation from a backup data store, read data objects of the backup data store in parallel into a buffer, wherein reading the data objects comprises reading chunks of a first data object into the buffer;
provide the data objects from the buffer to a data compressor that incrementally compresses the data objects as the data objects are received at the data compressor to produce compressed data objects, wherein providing the data objects from the buffer to the data compressor comprises providing the chunks of the first data object to the data compressor;
transfer, from the data compressor, the compressed data objects in parallel to a target data store as part of the data restore operation,
wherein, as part of the data restore operation,
mount a volume of the backup data store as a virtual storage device, wherein the virtual storage device after mounting is initially empty,
wherein the volume of the backup data store is associated with a plurality of data objects;
determine which of the plurality data objects associated with the volume that are in a cache memory of the system,
transfer a given data object of the plurality of data objects from the cache memory to the virtual storage device if the given object is in the cache memory, and
retrieve a further data object from the backup data store to the virtual storage device if the further data object is not in the cache memory.

13. The non-transitory machine-readable storage medium of claim 12, wherein the instructions upon execution cause the system to:
transfer the data objects associated with the volume from the virtual storage device to the buffer.

14. The non-transitory machine-readable storage medium of claim 12, wherein the instructions upon execution cause the system to:
receive, from a user interface of a client device, a selection of the data objects associated with the volume to restore in the data restore operation, wherein the data objects of the volume are presented by the client device in the user interface based on metadata representing the data objects of the volume.

15. The non-transitory machine-readable storage medium of claim 14, wherein the data objects read into the buffer are selected data objects based on the selection from the user interface.

16. A system comprising:
a hardware processor; and
a non-transitory storage medium storing data restore instructions executable on the hardware processor to:
receive a selection of data objects of a backup data store to restore to a target data store in a data restore operation;
read the data objects of the backup data store in parallel using a plurality of read threads into a buffer, wherein reading the data objects comprises reading chunks of a first data object into the buffer;
provide the data objects from the buffer to a data compressor that adds the data objects into an archive object, wherein providing the data objects from the buffer to the data compressor comprises providing the chunks of the first data object to the data compressor;
incrementally compress, using the data compressor, the data objects as the data objects are added to the archive object, to progressively build the archive object; and
transfer, from the data compressor, the archive object to a target data store as part of the data restore operation;
determine that the first data object has a size that exceeds an object size threshold;
based on determining that the size of the first data object exceeds the object size threshold, divide the first data object into the chunks;
determine that the archive object has a size that exceeds an archive size threshold;
based on determining that the size of the archive object exceeds the archive size threshold, divide the archive object into a plurality of archive object chunks; and
transfer the archive object chunks in parallel using a plurality of write threads to a write data buffer.

17. A method comprising:
for a data restore operation, mounting, by a data restore appliance, a volume of a backup data store as a virtual storage device in a system;
receiving, by the data restore appliance, a selection of data objects of the volume to restore from the backup data store to a target data store;
retrieving, by the data restore appliance, the data objects of the volume to the virtual storage device;
transferring, by the data restore appliance, the data objects in parallel to a buffer;
as the data objects are added to the buffer, transferring, by the data restore appliance, the data objects to a data compressor;
incrementally compressing, by the data compressor, the data objects as the data objects are received by the data compressor from the buffer; and
transferring, by the data restore appliance, the compressed data objects to the target data store,
wherein the compressed data objects are contained in an archive object built by the data compressor, and the transferring of the compressed data objects to the target data store comprises:
determining whether the archive object has a size that exceeds a size threshold;
based on determining that the size of the archive object exceeds the size threshold, dividing the archive object into a plurality of archive object chunks;
transferring, by a parallel data write service of the data restore appliance, the archive object chunks in parallel using a plurality of write threads to a write data buffer; and
uploading, by the parallel data write service data of the archive object chunks and archive objects from the write data buffer to the target data store.

* * * * *